United States Patent
Chheda

(10) Patent No.: US 7,076,603 B1
(45) Date of Patent: Jul. 11, 2006

(54) METHOD FOR MAPPING A SELECTED SECTOR TO A ZONE ON A DISK

(75) Inventor: Nalin H. Chheda, Cerritos, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 358 days.

(21) Appl. No.: 10/404,485

(22) Filed: Mar. 31, 2003

(51) Int. Cl.
*G06F 12/00* (2006.01)

(52) U.S. Cl. ............... 711/111; 711/112; 360/72.1

(58) Field of Classification Search ............ 360/48; 711/111–114
See application file for complete search history.

(56) References Cited

U.S. PATENT DOCUMENTS

| | | | | |
|---|---|---|---|---|
| 5,271,018 A | * | 12/1993 | Chan | 714/710 |
| 5,561,566 A | * | 10/1996 | Kigami et al. | 360/48 |
| 5,822,142 A | | 10/1998 | Hicken | |
| 5,983,309 A | * | 11/1999 | Atsatt et al. | 711/4 |
| 6,327,641 B1 | | 12/2001 | Xiao et al. | |
| 6,393,511 B1 | | 5/2002 | Albrecht et al. | |
| 6,560,052 B1 | * | 5/2003 | Ng et al. | 360/48 |
| 6,591,339 B1 | * | 7/2003 | Horst et al. | 711/114 |
| 2003/0065872 A1 | | 4/2003 | Edgar et al. | |

* cited by examiner

*Primary Examiner*—T Nguyen
(74) *Attorney, Agent, or Firm*—Ramin Mobarhan, Esq.

(57) ABSTRACT

A method is disclosed for mapping a selected sector to a zone on a disk having a plurality of zones during the operations of a disk drive. The method includes receiving a sector address corresponding to the selected sector and calculating an average zone capacity for the disk. The method further includes approximating the zone for the selected sector from the calculated average zone capacity and the received sector address.

6 Claims, 5 Drawing Sheets

METHOD FOR MAPPING A SELECTED SECTOR TO A ZONE ON A DISK

FIELD OF THE INVENTION

This invention relates to data sectors on disks in a disk drive. More particularly, the invention is directed to mapping a selected sector to a zone on a disk.

BACKGROUND OF THE INVENTION

Disk drives conventionally partition disk surfaces into logical zones for optimizing storage capacity by varying bit density within each of the logical zones. The zones may be visualized as concentric bands of tracks with a varying progression of bit density from band to band. Each zone stores a range of user data blocks which are addressed by a host computer using a logical block address (LBA). The disk drive comprises an intelligent control system which translates the host specified LBA into an internal address. As is known in the art, the internal address may result from a translation process that translates the LBA into an internal absolute block address (ABA) that is eventually translated into a physical sector address and track address.

The disk drive control system may maintain a set of zone tables where each table provides information about the zone including for example an address of the first user data block in the zone. Other parameters in the zone table enable the control system to determine in which zone a given user data block resides by searching the zone tables to locate the sector corresponding to the block address.

In most cases, the disk drive control system can accomplish this table search without compromising performance because the zone tables are stored in memory when the drive is initialized for operation and only one set of tables is required because each disk surface has an identical format. The highly competitive disk drive market has more recently driven initiatives to minimize cost by allowing for variations in surface format such that multiple sets of zone tables may be required. Detrimentally, this could require increased memory for storing the tables and increased processor execution overhead to perform searches of the expanded tables.

Accordingly, what is needed is a method for determining in which zone in a disk a given user data block resides, while reducing processor execution overhead.

SUMMARY OF THE INVENTION

This invention can be regarded as a method of mapping a selected sector to a zone on a disk having a plurality of zones during the operations of a disk drive. The method includes receiving a sector address corresponding to the selected sector and calculating an average zone capacity for the disk.

The method further includes approximating the zone for the selected sector from the calculated average zone capacity and the received sector address.

DETAILED DESCRIPTION OF THE INVENTION

Figure 1:
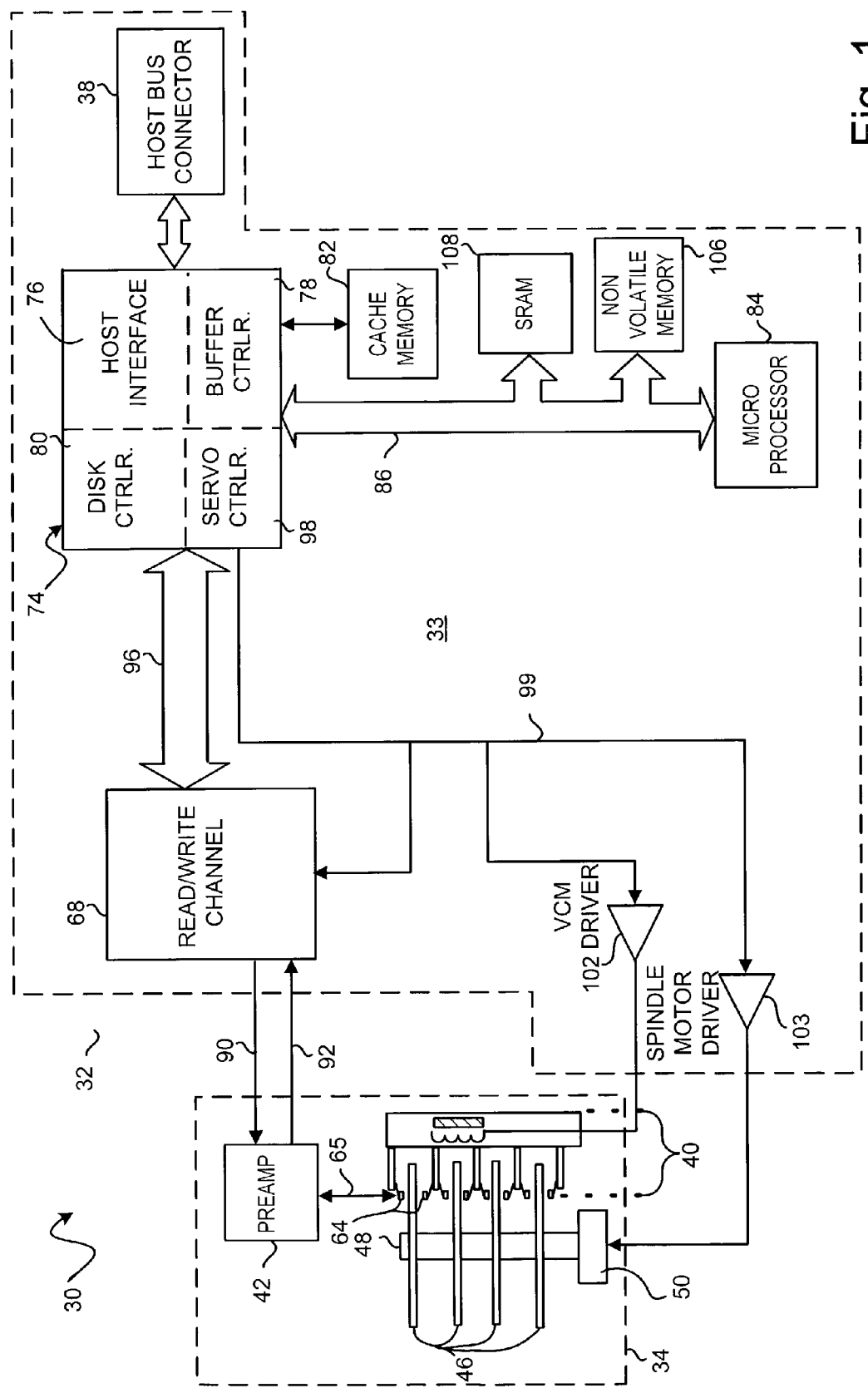
FIG. 1 is a block diagram of a disk drive in which the invention may be practiced.

With reference to FIG. 1, a block diagram of a disk drive 30 is shown in which the invention may be practiced. Disk drive 30 is connectable to a host computer (not shown) via host bus connector 38 for the transfer of commands, status and data. One suitable standard for such connection is the Advanced Technology Attachment (ATA) standard presently favored for desktop personal computers. Disk drive 30 comprises a Head Disk Assembly (HDA) 34, and a disk drive control system 33 mounted on a printed circuit board assembly (PCBA) 32.

As shown in FIG. 1, HDA 34 comprises one or more disks 46 for data storage; a spindle motor 50 for rapidly spinning each disk 46 (four shown) on a spindle hub 48; and an actuator assembly 40 for swinging heads 64 in unison over each disk 46. The heads 64 are connected to a preamplifier 42 via a trace assembly 65 for reading and writing data on disks 46. Preamplifier 42 is connected to channel circuitry in control system 33 via read data line 92 and write data line 90.

The control system 33 comprises a read/write channel 68, host interface and disk controller (HIDC) 74, voice coil motor driver (VCM) 102, spindle motor driver (SMD) 103, microprocessor 84, and several memory arrays such as buffer or cache memory 82, static random access memory (SRAM) 108, and non-volatile memory 106. A serial bus 99 provides a medium for bi-directional transfer of digital data for programming and monitoring channel 68, VCM driver 102 and SMD 103. Host-initiated operations for reading and writing data in disk drive 30 are executed under control of microprocessor 84 connected to the controllers and memory arrays via a bus 86. Program codes that are executed by microprocessor 84 is stored in non-volatile memory 106 and random access memory SRAM 108. Program overlay code stored on reserved tracks of disks 46 may also be loaded into SRAM 108 as required for execution.

During disk read and write operations, data transferred by preamplifier 42 is decoded and encoded by read/write channel 68. During read operations, channel 68 decodes data into digital bits transferred on an NRZ bus 96 to HIDC 74. During write operations, HIDC 74 provides digital data over the NRZ bus 96 to read/write channel 68 which encodes the data prior to its transmittal to preamplifier 42.

The HIDC 74 comprises a disk controller 80 for formatting and providing error detection and correction of disk data, a host interface controller 76 for responding to commands from host 36, and a buffer controller 78 for storing data which is transferred between disks 46 and host (not shown). Collectively the controllers in HIDC 74 provide automated functions which assist microprocessor 84 in controlling disk operations.

The servo controller circuit 98 in HIDC 74 provides an interface between microprocessor 84 and actuator assembly 40 and spindle motor 50. Microprocessor 84 commands logic in servo controller 98 to position actuator 40 using a VCM driver 102 to precisely control the rotation of spindle motor 50 with a spindle motor driver 103.

Figure 2:
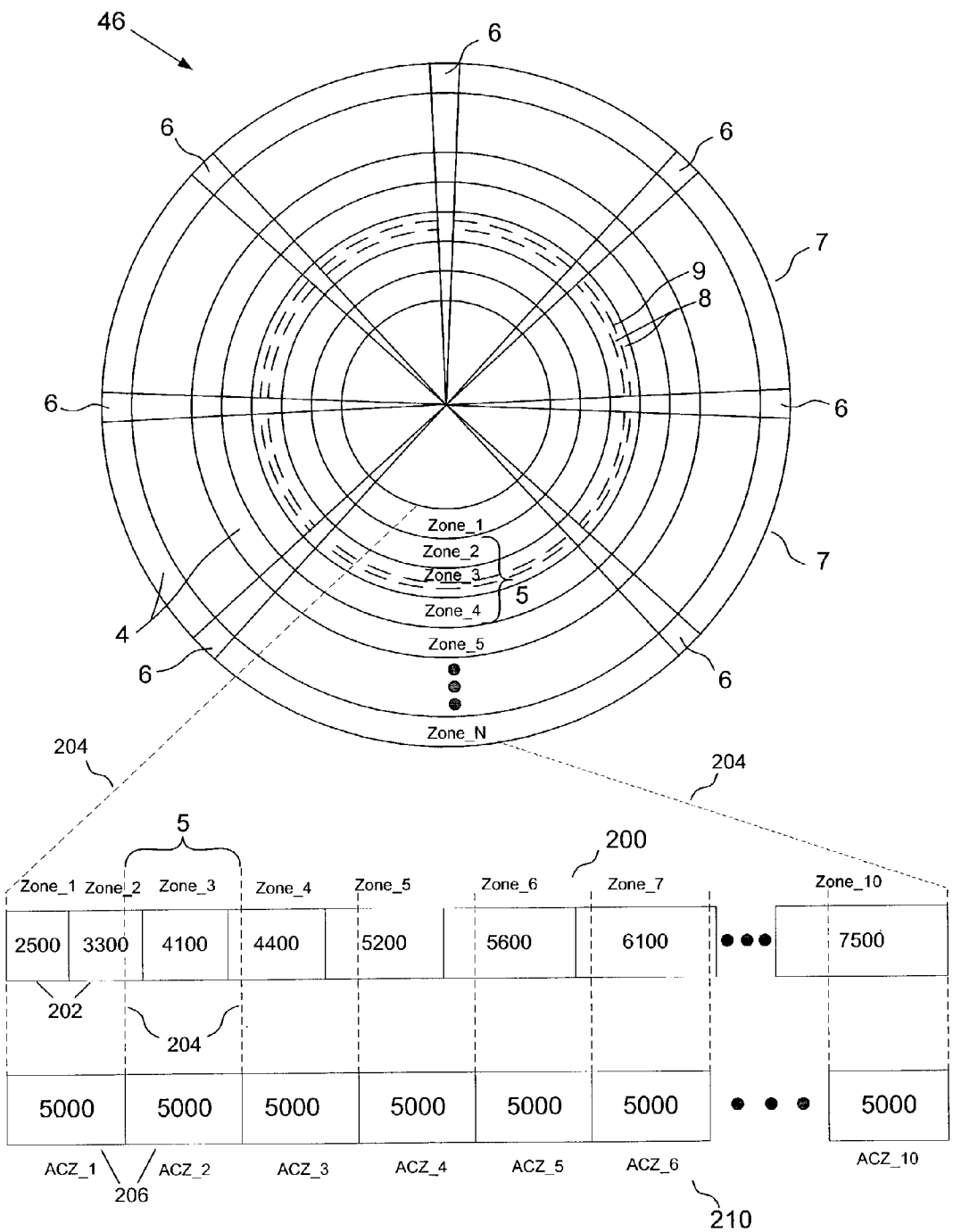
FIG. 2 illustrate a disk formatted for use with a disk drive employing an embodiment of the present invention.

FIG. 2A illustrates a disk 46 formatted for use with disk drive 30 shown in FIG. 1. As shown in FIG. 2, disk 46 is partitioned into radially-spaced concentric zones 4, such as zone_1 through zone_N, each of which have a number of tracks 8. Each track 8 comprises data sectors, such as data sector 9. The disk 46 further includes embedded servo sectors 6 disposed between wedge-like areas 7 on the disk for use in positioning the head 64 over a desired track 8 during write and read operations. Suitably, data sectors are recorded in the intervals between servo sectors 6 on each track 8. Servo sectors 6 are then sampled at regular intervals by channel 68, and are processed by servo controller 98 to provide position information to microprocessor 84 via bus 86.

Figure 3:
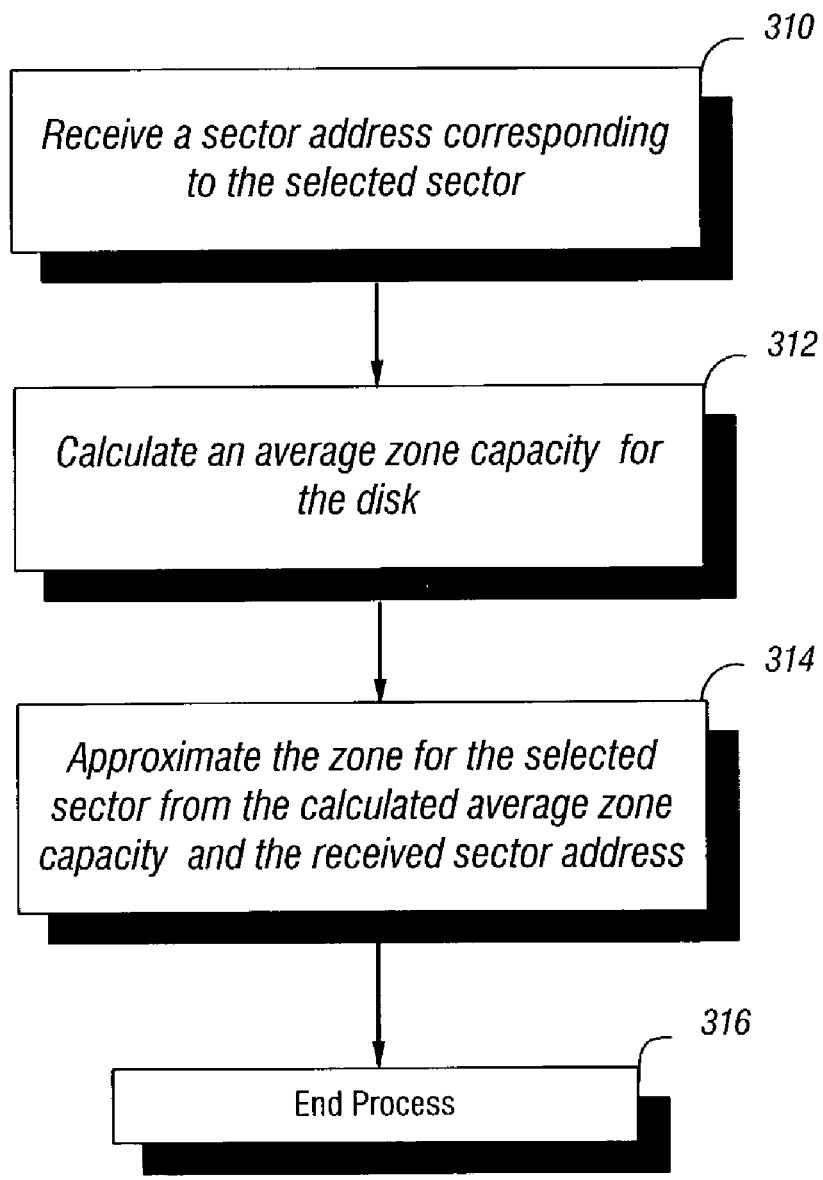
FIG. 3 is a flow chart illustrating a process used in an embodiment of the invention.

Referring to FIG. 3 in conjunction with FIG. 2, a process used in an embodiment of the invention is illustrated for mapping a selected sector, such as sector 9, to a zone, such as zone_3 on the disk 46 during the operations of disk drive 30. As shown in FIG. 3, the process begins at block 310 in which the disk drive control system 33 receives a sector address corresponding to the selected sector, such as selected sector 9. In one embodiment of the invention, the received sector address is the logical block address (LBA) of the selected sector. In another embodiment, the received sector address is the absolute block address (ABA) of the selected sector.

Next, in block 312, an average zone capacity for the disk 46 is calculated, as described below and in greater detail in conjunction with FIG. 4. Next, in block 314, the zone for the selected sector is approximated from the calculated average zone capacity and the received sector address, as described below and in greater detail in conjunction with FIG. 5. The flow then proceeds to block 316 in which the process ends.

Figure 4:
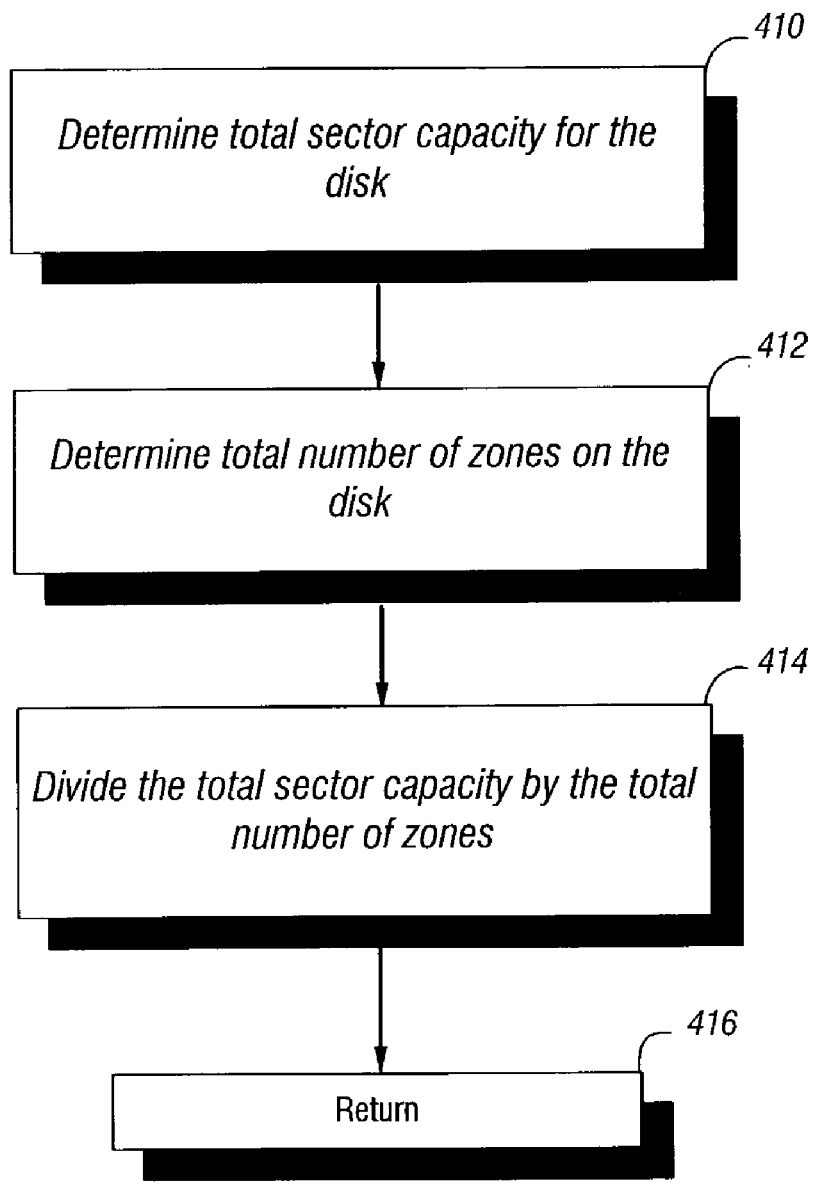
FIG. 4 is a flow chart further illustrating the process used in the embodiment of the invention shown in FIG. 3.

FIG. 4, in conjunction with FIG. 2, illustrate in greater detail the calculation process in block 312 of FIG. 3. As shown in FIG. 4, the process begins at block 410 in which a total sector capacity for the disk 46 is determined. As is known in the art, disk drives store parameters to identify the ranges of data sectors during their manufacturing. Suitably, the total sector capacity for the disk is the total number of addressable sectors (or blocks) on disk 46.

For ease of illustrating the process of the present invention, an exemplary zone-diagram 200 having zone blocks 202 is provided in FIG. 2 and used throughout the detailed description. As shown by lines 204, the zone-diagram 200 is a linear representation of the concentric zones 4 of disk 46, with each block 202 corresponding to one zone 4 in disk 46. For exemplary purposes, zone-diagram 200 represents a disk 46 having 10 zones (zone_1 to zone_10). The number of addressable sectors for each zone 4 is shown in each block 202 whose graphical size is allocated based on the number of addressable sectors per zone. For example, zone_1 is shown to have 2500 addressable sectors, zone_2 as having 3300 addressable sectors, etc. but with zone_1 also represented by a proportionally smaller graphical block area than zone_2. The total sector capacity for the disk 46 is then the sum of all the addressable sectors of all blocks 202, from zone_1 to zone_10. For the purposes of this example only, the total sector capacity for the disk 46 is determined to be 50,000 sectors. It should be noted that the number of zones and the distribution pattern of addressable sectors per zone as shown in zone-diagram 200 is exemplary only and that the use of other disk surfaces having different number of zones and/or distribution patterns of addressable sectors per zone, such as nonlinear and random distributions, are also contemplated to be within the scope of the present invention.

Returning to FIG. 4, next, in block 412, the total number of zones 4 in disk 46 is determined, using parameters stored during manufacturing as is known in the art. In the above example, the total number of zones 4 in disk 46 is determined to be 10 (zone_1 to zone_10). Next, in block 414, the average zone capacity of block 312 is determined by dividing the total sector capacity (determined in block 410) by the total number of zones (determined in block 412). In the above example, the average zone capacity (AZC) of block 312 is determined to be 5000 by dividing 50,000 (the total sector capacity) by 10 (the total number of zones). Zone-diagram 210 of FIG. 2 represents a virtual disk 46 having 10 zones (AZC_1 to AZC_10) each represented by a block 206. The number of addressable sectors for each of zones AZC_1 to AZC_10, however, is the average zone capacity (AZC), such as 5000, and thus each block 206 is apportioned the same graphical area in the illustration. Returning to FIG. 4, the process flow then proceeds to block 416 for returning to block 312 of FIG. 3.

Figure 5:
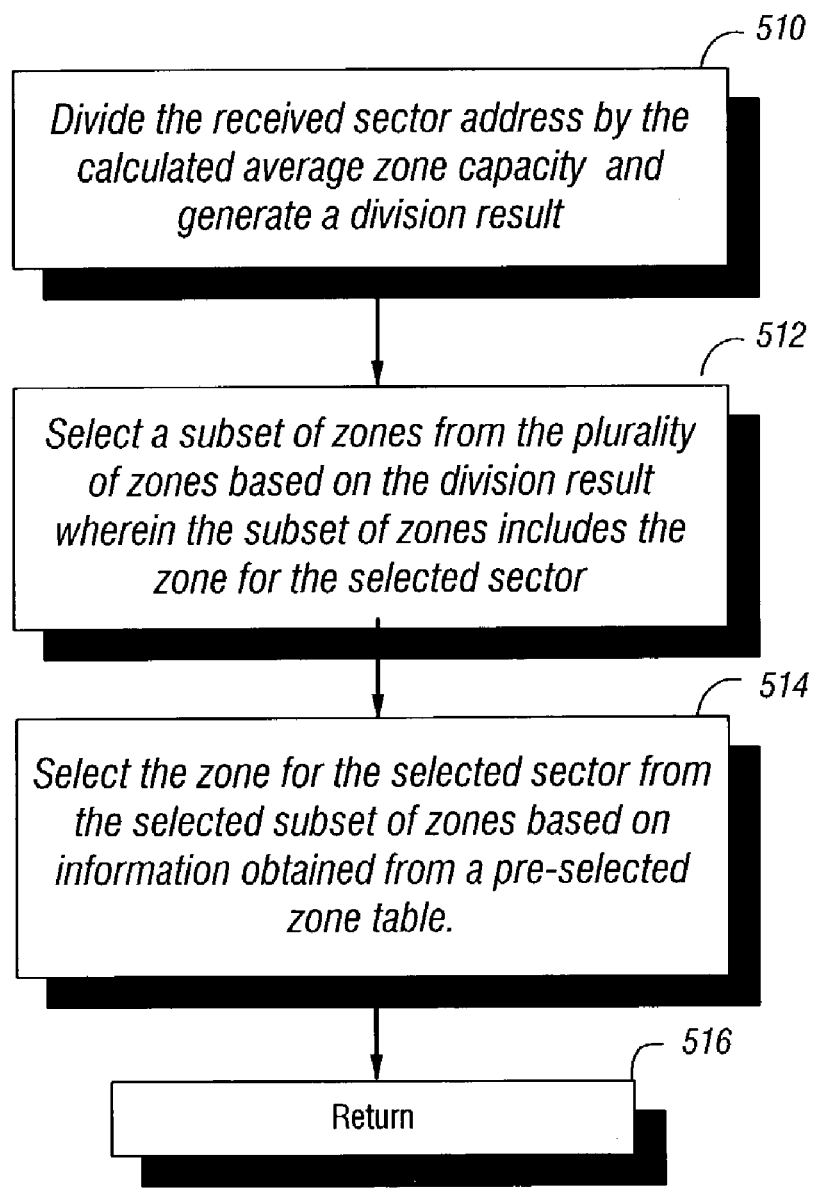
FIG. 5 is another flow chart further illustrating the process used in the embodiment of the invention shown in FIG. 3.

FIG. 5, in conjunction with FIG. 2, illustrate in greater detail the approximation process in block 314 of FIG. 3. As shown in FIG. 5, the process begins at block 510 in which the received sector address (from block 310) is divided by the calculated average zone capacity (from block 312) to generate a division result. In the above example, for a data sector 9 having an exemplary sector address of 8000 selected from an exemplary sector address range of 0 to 50,000, the division result is 1.6 (8000 divided by 5000).

Next, in block 512, the division result is used to select a subset of zones 5 from the zones 4 in disk 46, such as zone_2, zone_3 and zone_4, as shown in FIG. 2. The subset of zones 5 includes the zone for the selected sector, such as zone_3 for the selected sector 9.

In the above example, the division result of 1.6 signifies that the selected sector 9 with an exemplary sector address of 8000 is in the second zone of zone-diagram 210 (i.e. in ACZ_2). As shown by lines 208 which illustrate a virtual transposition of zone-diagram 210 on the zone-diagram 200, the ACZ_2 area representing 5000 sectors extends across a subset of zones 5 in zone-diagram 200, signifying that the selected sector 9 with a sector address of 8000 may reside in any one of zone_2, zone_3 and zone_4 in disk 46. Nonetheless, the approximation has advantageously narrowed the search for the host zone of the selected sector 9 to a subset 5 of only three zones which include zone_3, the actual host zone of the selected sector 9. In one embodiment, the division result is used to approximate the residence of a selected sector to within two zones of the host zone of a selected sector. Suitably, the division result is used to approximate the residence of a selected sector to within one zone of the host zone of a selected sector.

Returning to FIG. 5, next, in block 514, the exact zone for the selected sector, such as zone_3 for selected sector 9 in the above example, is selected from the selected subset of zones 5 based on the information obtained from a pre-selected zone table. Suitably, the pre-selected zone table is a reduced zone table containing only the ending ABA for each zone 4 in disk 46. The approximation process of the present invention in effect provides a virtual index to an approximate zone table at where the exact location for a selected sector can be more readily found. The process flow then proceeds to block 516 for returning to block 314 of FIG. 3. The overall process flow then proceed to and ends in block 316.

One advantage of the present invention over the prior art is that by performing the foregoing process, it can be determined on the fly in which zone 4 in a disk 46 a given data sector 9 resides, thus minimizing the need for increased memory for storing one or more zone tables and the increased processor execution overhead associated with performing searches of a larger number of zone tables.

What is claimed is:

1. A method for mapping a selected sector to a zone on a disk having a plurality of zones during the operations of a disk drive, the method comprising:
   receiving a sector address corresponding to the selected sector;
   calculating an average zone capacity for the disk; and
   approximating the zone for the selected sector from the calculated average zone capacity and the received sector address;
   wherein calculating the average zone capacity further comprises:
      determining a total sector capacity for the disk;
      determining a total number of the plurality of zones on the disk; and
      dividing the total sector capacity by the total number of zones.

2. The method as claimed in claim 1, wherein the received sector address is the logical block address (LBA) of the selected sector.

3. The method as claimed in claim 1, wherein the received sector address is the absolute block address (ABA) of the selected sector.

4. A method for mapping a selected sector to a zone on a disk having a plurality of zones during the operations of a disk drive, the method comprising:
   receiving a sector address corresponding to the selected sector;
   calculating an average zone capacity for the disk; and
   approximating the zone for the selected sector from the calculated average zone capacity and the received sector address;
   wherein the approximating further comprises:
      dividing the received sector address by the calculated average zone capacity and generating a division result.

5. The method as claimed in claim 4, wherein the approximating further comprises:
   selecting a subset of zones from the plurality of zones based on the division result wherein the subset of zones includes the zone for the selected sector.

6. The method as claimed in claim 5, wherein the approximating further comprises:
   selecting the zone for the selected sector from the selected subset of zones based on information obtained from a pre-selected zone table.

* * * * *